United States Patent
Ranganathan et al.

(10) Patent No.: US 12,388,101 B2
(45) Date of Patent: Aug. 12, 2025

(54) FUEL CELL SYSTEM INCLUDING FUEL EXHAUST PROCESSOR AND METHOD OF OPERATING THE SAME

(71) Applicant: Bloom Energy Corporation, San Jose, CA (US)

(72) Inventors: Srikanth Ranganathan, San Jose, CA (US); David Weingaertner, San Jose, CA (US); Ryan Johnson, San Jose, CA (US); Jayakumar Krishnadass, San Jose, CA (US)

(73) Assignee: BLOOM ENERGY COPORATION, San Jose, CA (US)

( * ) Notice: Subject to any disclaimer, the term of this patent is extended or adjusted under 35 U.S.C. 154(b) by 383 days.

(21) Appl. No.: 18/054,648

(22) Filed: Nov. 11, 2022

(65) Prior Publication Data

US 2023/0155151 A1    May 18, 2023

Related U.S. Application Data (60) Provisional application No. 63/278,485, filed on Nov. 12, 2021.

(51) Int. Cl.
*H01M 8/0662* (2016.01)
*B01D 53/32* (2006.01)
(Continued)

(52) U.S. Cl.
CPC ........ *H01M 8/0681* (2013.01); *B01D 53/326* (2013.01); *B01J 8/001* (2013.01);
(Continued)

(58) Field of Classification Search
CPC ........... H01M 8/0681; H01M 8/04014; H01M 8/04097; H01M 8/04201; H01M 8/04373;
(Continued)

(56) References Cited

U.S. PATENT DOCUMENTS

2008/0241612 A1    10/2008    Ballantine et al.
2012/0178003 A1    7/2012     Venkataraman et al.
(Continued)

FOREIGN PATENT DOCUMENTS

KR    20140055805 A    5/2014

OTHER PUBLICATIONS

European Search Report mailed May 22, 2023 in corresponding European Application No. 22206900.7.
(Continued)

*Primary Examiner* — Matthew J Merkling
(74) *Attorney, Agent, or Firm* — THE MARBURY LAW GROUP PLLC (57) ABSTRACT

A fuel cell system and method, the system including a hotbox, a fuel cell stack disposed in the hotbox, an anode tail gas oxidizer (ATO) disposed in the hotbox, and a fuel exhaust processor fluidly connected to the hotbox. The fuel exhaust processor includes a first hydrogen pump configured to extract hydrogen from the anode exhaust received from the fuel cell stack and to output the hydrogen to a first hydrogen stream provided to the fuel cell stack, a second hydrogen pump configured to extract hydrogen from anode exhaust output from the first hydrogen pump and to output the hydrogen to the first hydrogen stream, and a third hydrogen pump configured to extract hydrogen from anode exhaust output from the second hydrogen pump and to output the hydrogen to a second hydrogen stream provided to the ATO.

20 Claims, 7 Drawing Sheets

(51) Int. Cl.

| | |
|---|---|
| *B01J 8/00* | (2006.01) |
| *B01J 8/04* | (2006.01) |
| *H01M 8/04014* | (2016.01) |
| *H01M 8/04082* | (2016.01) |
| *H01M 8/04089* | (2016.01) |
| *H01M 8/0432* | (2016.01) |
| *H01M 8/0438* | (2016.01) |
| *H01M 8/04746* | (2016.01) |
| *H01M 8/04858* | (2016.01) |
| *H01M 8/0668* | (2016.01) |

(52) U.S. Cl.
 CPC ....... *B01J 8/0492* (2013.01); *H01M 8/04014* (2013.01); *H01M 8/04097* (2013.01); *H01M 8/04201* (2013.01); *H01M 8/04373* (2013.01); *H01M 8/04388* (2013.01); *H01M 8/04776* (2013.01); *H01M 8/0491* (2013.01); *H01M 8/0668* (2013.01); *B01J 2208/00044* (2013.01); *B01J 2208/00884* (2013.01)

(58) Field of Classification Search
 CPC ......... H01M 8/04388; H01M 8/04776; H01M 8/0491; H01M 8/0668; B01J 8/001; B01J 8/0492; B01J 2208/00044; B01J 2208/00884; B01D 53/326
 See application file for complete search history.

(56) References Cited

U.S. PATENT DOCUMENTS

| | | | | |
|---|---|---|---|---|
| 2014/0072889 | A1* | 3/2014 | McElroy | H01M 8/222 |
| | | | | 429/410 |
| 2017/0350021 | A1* | 12/2017 | Kawabata | B01D 63/00 |
| 2018/0100243 | A1* | 4/2018 | Yakumaru | H01M 8/0245 |
| 2018/0155193 | A1* | 6/2018 | Sakai | H01M 8/0681 |
| 2019/0140295 | A1* | 5/2019 | Ghezel-Ayagh | B01D 8/0681 |
| 2019/0214660 | A1 | 7/2019 | Pratap et al. | |
| 2020/0303758 | A1 | 9/2020 | Karuppaiah et al. | |
| 2020/0328445 | A1 | 10/2020 | Weingaertner et al. | |
| 2021/0050610 | A1* | 2/2021 | Ghezel-Ayagh | |
| | | | | H01M 8/04097 |

OTHER PUBLICATIONS

Search Report Mailed Sep. 19, 2023 in corresponding European Application No. 22206900.7.

\* cited by examiner

FUEL CELL SYSTEM INCLUDING FUEL EXHAUST PROCESSOR AND METHOD OF OPERATING THE SAME

CROSS-REFERENCE TO RELATED APPLICATIONS

This application is a non-provisional application that claims the benefit of U.S. provisional Application No. 63/278,485, filed on Nov. 12, 2021, the contents of which are herein incorporated by reference in their entirety.

FIELD OF THE INVENTION

Aspects of the present invention relate to fuel cell systems and methods, and more particularly, to fuel cell systems including a fuel exhaust processing module configured to generate purified carbon dioxide and hydrogen streams.

BACKGROUND OF THE INVENTION

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY OF THE INVENTION

According to various embodiments, provided is a fuel cell system comprising: a hotbox; a fuel cell stack disposed in the hotbox; an anode tail gas oxidizer (ATO) disposed in the hotbox; and a fuel exhaust processor fluidly connected to the hotbox and comprising: a first hydrogen pump configured to extract hydrogen from the anode exhaust received from the fuel cell stack and to output the hydrogen to a first hydrogen stream provided to the fuel cell stack; a second hydrogen pump configured to extract hydrogen from anode exhaust output from the first hydrogen pump and to output the hydrogen to the first hydrogen stream; and a third hydrogen pump configured to extract hydrogen from anode exhaust output from the second hydrogen pump and to output the hydrogen to a second hydrogen stream provided to the ATO.

According to various embodiments, provided is a fuel cell system, comprising: a hotbox; a fuel cell stack disposed in the hotbox; an anode tail gas oxidizer (ATO) disposed in the hotbox; and a recycling conduit configured to receive anode exhaust from the fuel cell stack; a splitter fluidly connected to the recycling conduit; a low temperature shift reactor; a hydrogen separator comprising: a first hydrogen pump; a second hydrogen pump that is fluidly connected to the first hydrogen pump; and a third hydrogen pump that is fluidly connected to the second hydrogen pump; a supply conduit that fluidly connects an outlet of the splitter to the hydrogen separator; a first separator conduit fluidly connecting the splitter to the low temperature shift reactor; a second separator conduit fluidly connecting the low temperature shift reactor to the first hydrogen pump; a first return conduit that fluidly connects an outlet of the splitter to the fuel cell stack; a second return conduit that fluidly connects an outlet of the splitter or the separator conduit to the ATO; and a third return conduit that fluidly connects the separator conduit to the second return conduit.

According to various embodiments, provided is a fuel cell system comprising: a hotbox; a fuel cell stack disposed in the hotbox; an anode tail gas oxidizer (ATO) disposed in the hotbox; and a fuel exhaust processor fluidly connected to the hotbox and comprising: a first hydrogen pump configured to extract hydrogen from the anode exhaust received from the fuel cell stack; and a second hydrogen pump configured to extract hydrogen from anode exhaust output from the first hydrogen pump; wherein the first hydrogen pump and the second hydrogen pump output hydrogen to one or more components of the hotbox.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION OF THE INVENTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In a solid oxide fuel cell (SOFC) system, a fuel inlet stream may be humidified in order to facilitate fuel reformation reactions such as steam reformation and water-gas shift reactions. In addition, during system startup, shutdown, and power grid interruption events, water may be added to a fuel inlet stream in order to prevent coking of system components such as catalysts. Conventionally, such humidification is performed by vaporizing water in a steam generator containing corrugated tubing. Water flows through the corrugated tubing and is heated by the cathode recuperator heat exchanger exhaust stream which flows around the outside of the tubing. However, utilizing relatively low-temperature cathode recuperator exhaust stream generally requires substantial lengths of corrugated tubing, in order to absorb enough heat to vaporize the water. Further, the steam generator is relative large and bulky, which also adds to the system size, complexity and manufacturing costs.

In contrast, embodiments of the present disclosure provide a water injector configured to inject water directly into the anode exhaust recycle stream which provides heat to vaporize the water into steam and/or aerosolize the water into droplets small enough to be entrained in the anode exhaust stream. The anode exhaust recycle stream is recycled into the fuel inlet stream provided into the fuel cell stack, such that humidified fuel is provided to the fuel cells of the fuel cell stack. Thus, the prior art steam generator may be omitted to reduce system size, complexity and cost. In addition, the embodiment system may operate using relatively short, non-corrugated water conduit, which may improve system response times and reduce system size and cost.

Sofc Systems

Figure 1:
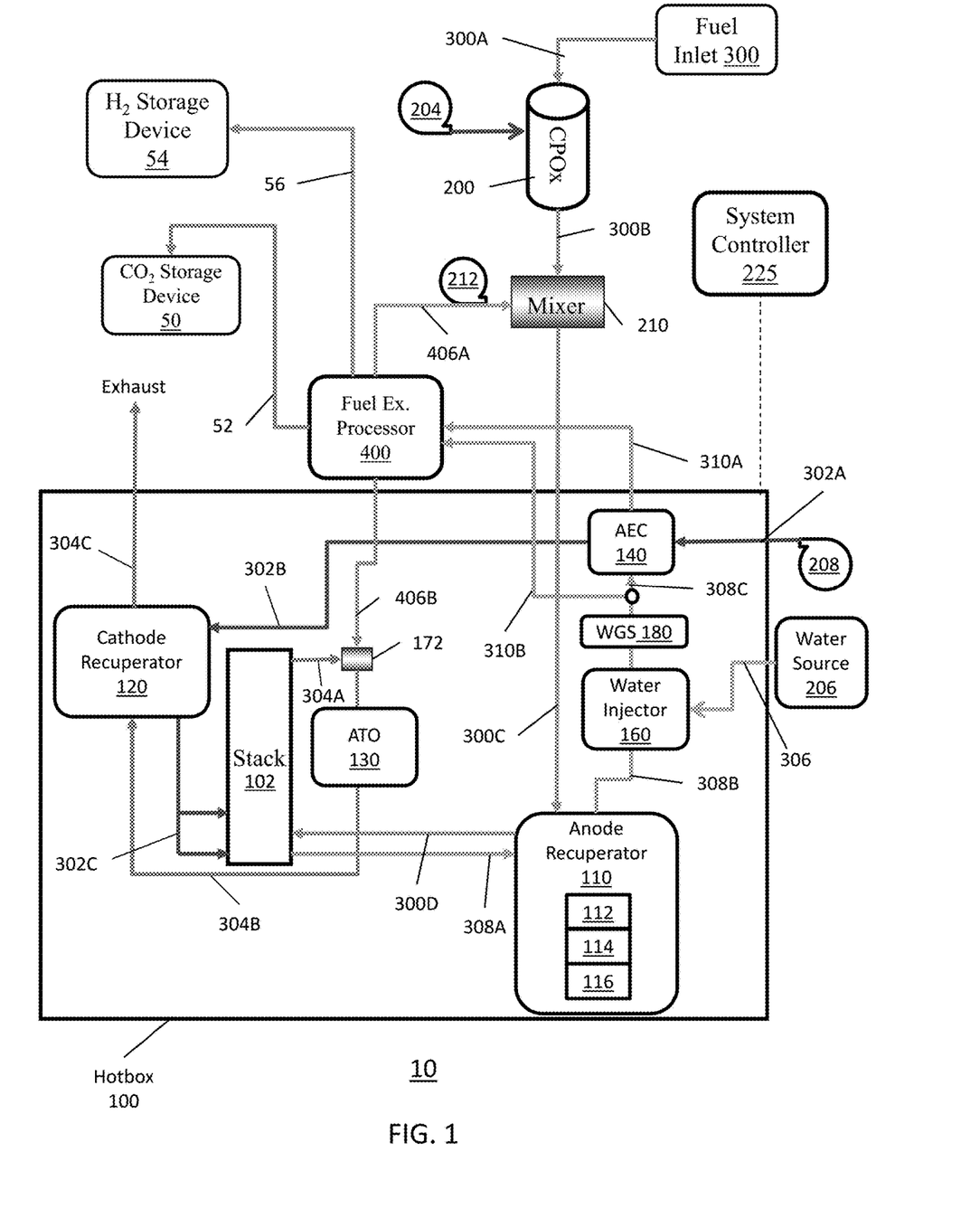
FIG. 1 is a schematic view of a solid oxide fuel cell (SOFC) system, according to various embodiments of the present disclosure.

FIG. 1 is a schematic representation of a SOFC system 10, according to various embodiments of the present disclosure. Referring to FIG. 1, the system 10 includes a hotbox 100 and various components disposed therein or adjacent thereto. The hotbox 100 may contain at least one fuel cell stack 102, such as a solid oxide fuel cell stack containing alternating fuel cells and interconnects. One solid oxide fuel cell of the stack contains a ceramic electrolyte, such as yttria stabilized zirconia (YSZ), scandia stabilized zirconia (SSZ), scandia and ceria stabilized zirconia or scandia, yttria and ceria stabilized zirconia, an anode electrode, such as a nickel-YSZ, a nickel-SSZ or nickel-doped ceria cermet, and a cathode electrode, such as lanthanum strontium manganite (LSM). The interconnects may be metal alloy interconnects, such as chromium-iron alloy interconnects. The stacks 102 may be arranged over each other in a plurality of columns.

The hotbox 100 may also contain an anode recuperator heat exchanger 110, a cathode recuperator heat exchanger 120, an anode tail gas oxidizer (ATO) 130, an anode exhaust cooler heat exchanger 140, a vortex generator 172, and a water injector 160. The system 10 may also include a catalytic partial oxidation (CPOx) reactor 200, a mixer 210, a CPOx blower 204 (e.g., air blower), a system blower 208 (e.g., main air blower), and an anode recycle blower 212, which may be disposed outside of the hotbox 100. However, the present disclosure is not limited to any particular location for each of the components with respect to the hotbox 100.

The CPOx reactor 200 receives a fuel inlet stream from a fuel inlet 300, through fuel conduit 300A. The fuel inlet 300 may be a fuel tank or a utility natural gas line including a valve to control an amount of fuel provided to the CPOx reactor 200. The CPOx blower 204 may provide air to the CPOx reactor 200 during system start-up. The fuel and/or air may be provided to the mixer 210 by fuel conduit 300B. Fuel flows from the mixer 210 to the anode recuperator 110 through fuel conduit 300C. The fuel is heated in the anode recuperator 110 by a portion of the fuel exhaust and the fuel then flows from the anode recuperator 110 to the SOFC stack 102 through fuel conduit 300D.

The main air blower 208 may be configured to provide an air stream (e.g., air inlet stream) to the anode exhaust cooler 140 through air conduit 302A. Air flows from the anode exhaust cooler 140 to the cathode recuperator 120 through air conduit 302B. The air is heated by the ATO exhaust in the cathode recuperator 120. The air flows from the cathode recuperator 120 to the SOFC stack 102 through air conduit 302C.

Anode exhaust (e.g., fuel exhaust) generated in the SOFC stack 102 is provided to the anode recuperator 110 through anode exhaust conduit 308A. The anode exhaust may contain unreacted fuel and may also be referred to herein as fuel exhaust. The anode exhaust may be provided from the anode recuperator 110 to a shift reactor 180, such as an optional water gas shift (WGS) reactor, by anode exhaust conduit 308B. In some embodiments, the reactions of WGS reactor may alternatively be reacted in a low-temperature shift (LTS) reactor of the fuel exhaust processor 400. The water injector 160 may be fluidly connected to the anode exhaust conduit 308B. The anode exhaust may be provided from the shift reactor 180 to the anode exhaust cooler 140 by anode exhaust conduit 308C. The anode exhaust heats the air inlet stream in the anode exhaust cooler 140 and may then be provided from the anode exhaust cooler 140 to the fuel exhaust processor 400.

In particular, the anode exhaust may be output from the anode exhaust cooler 140 to the fuel exhaust processor 400 by a first recycling conduit 310A. In some embodiments, anode exhaust may be provided to the fuel exhaust processor 400 by an optional second recycling conduit 310B. In particular, the second recycling conduit 310B may be configured to provide hotter anode exhaust to the fuel exhaust processor 400 than the first recycling conduit 310A, since anode exhaust is cooled in the anode exhaust cooler 140 prior to entering the first recycling conduit 310A. In some configurations, anode exhaust can flow through both first recycling conduit 310A and second recycling conduit 310B.

The shift reactor 180 may be any suitable device that converts components of the fuel exhaust into free hydrogen ($H_2$) and/or water. For example, the shift reactor 180 may comprise a tube or conduit containing a catalyst that converts carbon monoxide (CO) and water vapor in the fuel exhaust stream into carbon dioxide and hydrogen, via the water gas shift reaction ($CO+H_2O \leftrightarrow CO_2+H_2$). Thus, the shift reactor 180 increases the amount of hydrogen and carbon dioxide in the anode exhaust and decreases the amount of carbon monoxide in the anode exhaust. For example, the shift reactor 180 may reduce the amount of carbon monoxide in the anode exhaust to about 5% by volume or less, such as about 4% or less, or about 3% or less. The catalyst may be any suitable catalyst, such as an iron oxide or a chromium-promoted iron oxide catalyst.

Cathode exhaust generated in the SOFC stack 102 flows to the ATO 130 through cathode exhaust conduit 304A. The vortex generator 172 may be disposed in the cathode exhaust conduit 304A and may be configured to swirl the cathode exhaust. The ATO fuel conduit 304A may be fluidly connected to the vortex generator 172 or to the cathode exhaust conduit 304A or the ATO 130 downstream of the vortex generator 172. The swirled cathode exhaust may mix with hydrogen output from the fuel exhaust processor 400 at the ATO 130 (e.g., at an ATO injector space). The mixture may be oxidized in the ATO 130 to generate ATO exhaust. The ATO exhaust flows from the ATO 130 to the cathode recuperator 120 through the cathode exhaust conduit 304B. Exhaust flows from the cathode recuperator 120 and out of the hotbox 100 through cathode exhaust conduit 304C.

Water flows from a water source 206, such as a water tank or a water pipe, to the water injector 160 through the water conduit 306. The water injector 160 injects water directly into first portion of the anode exhaust provided in the anode exhaust conduit 308C. Heat from the first portion of the anode exhaust (also referred to as a recycled anode exhaust stream) provided in the anode exhaust conduit 308C vaporizes the water to generate steam. The steam mixes with the anode exhaust, and the resultant mixture is provided to the anode exhaust cooler 140. The mixture is then routed through the fuel exhaust processor 400 and provided to the mixer 210. The mixer 210 is configured to mix natural gas (or CPOx effluent if the CPOx is lit) and anode recycle from the stream of the anode recycle blower 212. This humidified fuel mixture may then be heated in the anode recuperator 110 by the anode exhaust, before being provided to the SOFC stack 102. The system 10 may also include one or more fuel reforming catalysts 112, 114, and 116 located inside and/or downstream of the anode recuperator 110. The reforming catalyst(s) partially (e.g., 15%, 20%, etc.) reform the humidified fuel mixture before it is provided to the SOFC stack 102.

The system 10 may further include a system controller 225 configured to control various elements of the system 10. The system controller 225 may include a central processing unit configured to execute stored instructions. For example, the system controller 225 may be configured to control fuel and/or air flow through the system 10, according to fuel composition data.

Fuel Exhaust Processors

Figure 2:
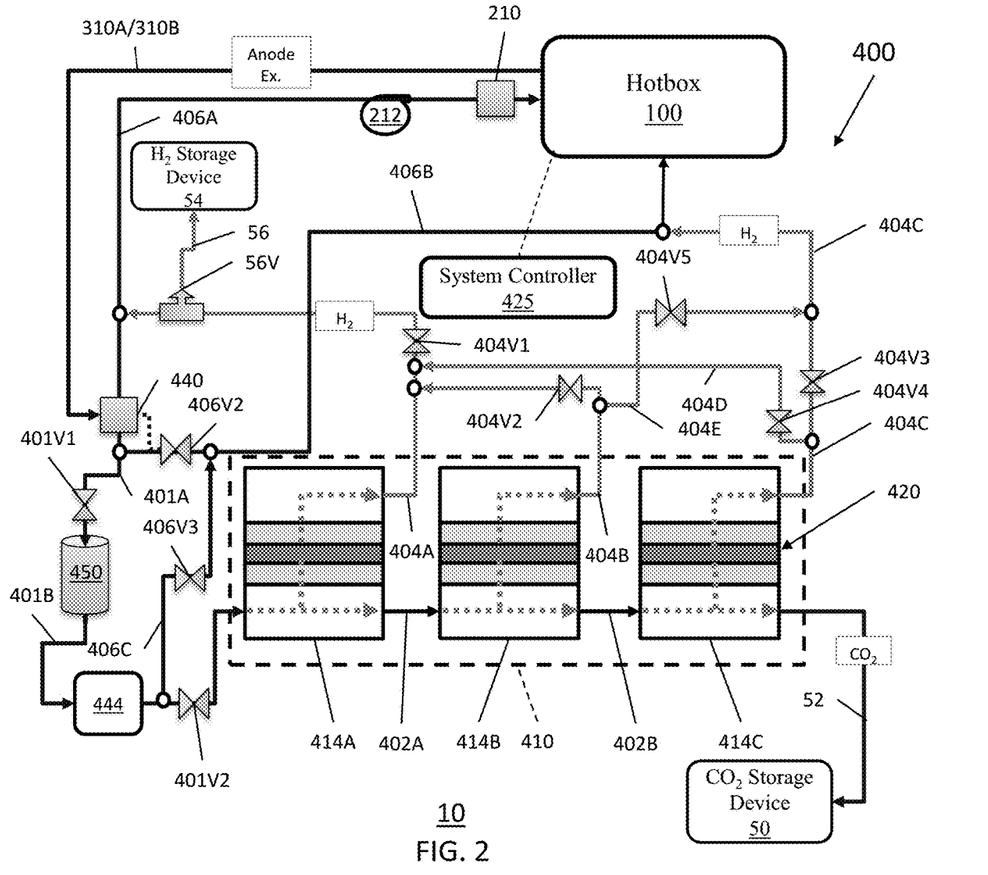
FIG. 2 is a schematic view of a fuel exhaust processor that may be included in the SOFC system of FIG. 1, according to various embodiments of the present disclosure.

FIG. 2 is a schematic view showing components of the fuel exhaust processor 400, according to various embodiments of the present disclosure. Referring to FIGS. 1 and 2, the fuel exhaust processor 400 may include a hydrogen separator 410, a system controller 425, a splitter 440, a low temperature shift reactor 450, and a heat exchanger 444. The system controller 425 may be a central processing unit configured to execute stored instructions. For example, the system controller 425 may be configured to control anode exhaust, hydrogen and/or carbon dioxide flow through the fuel exhaust processor 400. In some embodiments, the system controller 425 may be operatively connected to the system controller 225 of the SOFC system 10, such that the system controller 425 may control the fuel exhaust processor based on operating conditions of the SOFC system 10.

The splitter 440 may be configured to receive anode exhaust from the first recycling conduit 310A. The splitter 440 may be fluidly connected to the hotbox 100 and the hydrogen separator 410. For example, a first return conduit 406A may fluidly connect an outlet of the splitter 440 to the hotbox 100, and a first separator conduit 401A and a second separator conduit 401B may fluidly connect an outlet of the splitter 440 to the hydrogen separator 410. In particular, a first portion of the anode exhaust may be output from the splitter 440 and provided to the shift reactor 450 via the first separator conduit 401A, and anode exhaust output form the shift reactor 450 may be supplied to the hydrogen separator 410 by the second separator conduit 401B. A second portion of the anode exhaust may be output from an outlet of the splitter 440 to the first return conduit 406A. Anode exhaust output from the fuel exhaust processor 400 may be move through the first return conduit 406A to the mixer 210 of the SOFC system 10, by the anode recycle blower 212. However, the anode recycle blower 212 may be disposed in any other suitable location.

The shift reactor 450 may be a WGS reactor similar to the shift reactor 180, but may configured to operate at a lower temperature than the shift reactor 180. Accordingly, the shift reactor 180 may be referred to as a high temperature shift reactor, and the shift reactor 450 may be referred to as a low temperature shift reactor. The shift reactor 450 may be configured to further reduce the carbon monoxide content of the anode exhaust provided to the fuel exhaust processor 400. For example, the shift reactor 450 may be configured to reduce the carbon monoxide content of the anode exhaust to less than about 0.3% by volume, such as less than about 0.2%, or less than about 0.1%.

Purified anode exhaust (e.g., low carbon monoxide content anode exhaust) output from the shift reactor 450 may be provided to the hydrogen separator 410 by a second separator conduit 401B. The heat exchanger 444 may be operatively connected to the second separator conduit 401B and may be configured to cool anode exhaust passing there through. For example, the heat exchanger 444 may include fans and/or cooling fins configured to transfer heat to air supplied thereto. Accordingly, the heat exchanger 444 may be configured to cool the anode exhaust, in order to prevent overheating and/or damage to the hydrogen separator 410. In some embodiments, the heat exchanger 444 may be omitted. For example, if the shift reactor 450 includes an internal cooling system, as disclosed below with respect to FIGS. 4A and 4B, the heat exchanger 444 may optionally be omitted.

In various embodiments, the fuel exhaust processor 400 may be fluidly connected to multiple SOFC systems 10. For example, the fuel exhaust processor 400 may be configured to process anode exhaust output from two or more fuel cell systems, and may be configured to return hydrogen rich fuel streams to both fuel cell systems.

The hydrogen separator 410 may include one or more hydrogen pumps, which may each include electrochemical hydrogen pumping cells 420. For example, as shown in FIG. 2, the hydrogen separator 410 may include a first hydrogen pump 414A, a second hydrogen pump 414B, and a third hydrogen pump 414C, that each comprise stacked hydrogen pumping cells 420. However, the present disclosure is not limited to any particular number of hydrogen pumps. For example, in various embodiments, the first hydrogen pump 414A and the second hydrogen pump 414B may be combined into a single stack of hydrogen pumping cells 420. In other embodiments, the first, second, and third hydrogen pumps 414A, 414B, 414C may be combined into a single stack of hydrogen pumping cells 420.

In some embodiments, the first hydrogen pump 414A may include a larger number of hydrogen pumping cells 420 than the second and/or third hydrogen pumps 414B, 414C. For example, the first hydrogen pump 414A may include twice the number of hydrogen pumping cells 420 as the second hydrogen pump 414B and/or the third hydrogen pump 414C.

In still other embodiments, the fuel exhaust processor 400 may output only a single hydrogen stream. For example, the third hydrogen pump 414C may be omitted. In particular, heat generated by exothermic reactions in the ATO 130 may be used to offset heat losses due to endothermic fuel reformation reactions occurring in the anode recuperator 110, by using the ATO exhaust to heat air provided to the fuel cell stack 102 in the cathode recuperator 120. When there is no $H_2$ fuel fed to the ATO 130, then there is no exothermic reaction in the ATO 130. Accordingly, when the SOFC stacks are operated at steady state conditions where heat from the ATO 130 is not needed, then the fuel stream to the ATO 130 can be omitted.

The second separator conduit 401B may provide anode exhaust to an anode inlet of the first hydrogen pump 414A. An anode outlet of the first hydrogen pump 414A may be fluidly connected to an anode inlet of the second hydrogen pump 414B by a first exhaust conduit 402A. An anode outlet of the second hydrogen pump 414B may be fluidly connected to an anode inlet of the third hydrogen pump 414C, by a second exhaust conduit 402B. An anode outlet of the third hydrogen pump 414C may be fluidly connected to the carbon dioxide storage device 50, by a carbon dioxide storage conduit 52.

The carbon dioxide storage device 50 may include a carbon dioxide processor and a carbon dioxide storage tank. The processor may operate to compress and/or cool a carbon dioxide stream received from the fuel exhaust processor 400. The processor may be a condenser and/or dryer configured to remove water from the carbon dioxide stream. The carbon dioxide stream may be provided to the carbon dioxide storage device 50 in the form of a vapor, liquid, solid or supercritical carbon dioxide. The carbon dioxide storage device 50 also may condense the carbon dioxide into a liquid phase after compression.

A first hydrogen conduit 404A may be fluidly connected to a cathode outlet of the first hydrogen pump 414A, a second hydrogen conduit 404B may be fluidly connected to a cathode outlet of the second hydrogen pump 414B, and a third hydrogen conduit 404C may be fluidly connected to a cathode outlet of the third hydrogen pump 414C. The first hydrogen conduit 404A may be fluidly connected to a first return conduit 406A, and the second hydrogen conduit 404B may be fluidly connected to the first hydrogen conduit 404A. In particular, the first return conduit 406A may be configured to provide hydrogen extracted from the anode exhaust by the first hydrogen pump 414A, the second hydrogen pump 414B, and or the third hydrogen pump 414C to the mixer 210, such that the hydrogen may be recycled to the SOFC stack 102.

The third hydrogen conduit 404C may be fluidly connected to the SOFC system 10 by a second return conduit 406B. In particular, the second return conduit 406B may be configured to provide hydrogen extracted from the anode exhaust by the third stack 414C to the second return conduit 406B, which may provide the hydrogen to the ATO 130.

In some embodiments, an optional fourth hydrogen conduit 404D may fluidly connect the third hydrogen conduit 404C to the first hydrogen conduit 404A. An optional fifth hydrogen conduit 404E may fluidly connect the second hydrogen conduit 404B to the third hydrogen conduit 404C. An optional hydrogen storage conduit 56 may fluidly connect the first hydrogen conduit 404A to the hydrogen storage device 54.

The hydrogen storage device 54 may include, for example, a condenser and a hydrogen storage tank. The condenser may be an air-cooled or water-enhanced, air-cooled condenser and/or heat exchanger configured to cool a hydrogen stream received from the fuel exhaust processor 400, to a temperature sufficient to condense water vapor in the hydrogen stream. The hydrogen storage device 54 may further include compression to the desired storage pressure. A wide range of pressure above ambient is feasible, but is likely set to a value that corresponds with allowed piping standards (e.g., 150 psig, 300 psig, 600 psig, 1500 psig, etc.)

The first return conduit 406A may fluidly connect the splitter 440 to the mixer 210 of the SOFC system 10. The second return conduit 406B may fluidly connect the first separator conduit 401A to the ATO 130, and may also be fluidly connected to the third hydrogen conduit 404C. In other embodiments, the second return conduit 406B may be fluidly connected to an outlet of the splitter 440. A third return conduit 406C may fluidly connect the second separator conduit 401B to the second return conduit 406B.

In various embodiments, the fuel exhaust processor 400 may include various valves to control fluid flow. For example, a first separator conduit valve 401V1 and a second separator conduit valve 401V2 may be respectively configured to control anode exhaust flow through the first and second separator conduits 401A, 401B. A first hydrogen conduit valve 404V1, a second hydrogen conduit valve 404V2, a third hydrogen conduit valve 404V3, a fourth hydrogen conduit valve 404V4, and a fifth hydrogen conduit valve 404V5 may be configured to respectively control hydrogen flow through the first, second, third, fourth, and fifth hydrogen conduits 404A, 404B, 404C, 404D, 404E. A hydrogen storage valve 56V, such as a two way valve, may be configured to control hydrogen flow from the first hydrogen conduit 404A into the hydrogen storage conduit 56. A second return conduit valve 406V2 and a third return conduit valve 406V3, may be configured to respectively control anode exhaust flow through the second and third return conduits 406B, 406C.

In some embodiments, the fuel exhaust processor 400 may be fluidly connected to multiple hotboxes 100. For example, the splitter 440 may receive anode exhaust from multiple recycling conduits 310A/310B, and may be fluidly connected to multiple return conduits 406A, 406B. For example, the recycling conduits 310A/310B and the first and second return conduits 406A, 406B may be branched and connected to different hotboxes 100.

Hydrogen Pumping Cells

Figure 3:
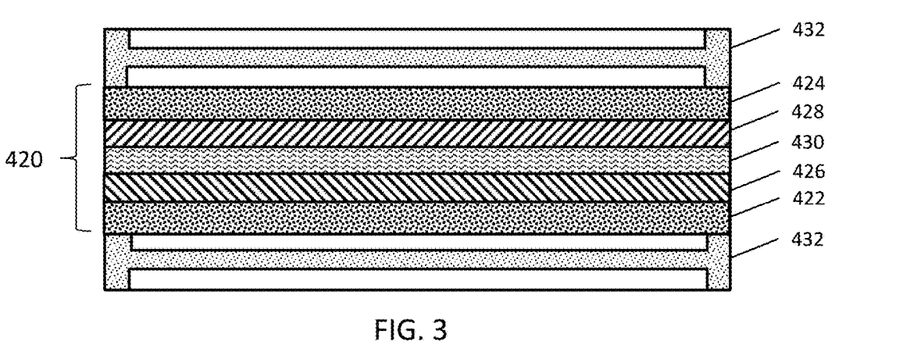
FIG. 3 is a cross-sectional view of a hydrogen pumping cell that may be included in the fuel exhaust processor of FIG. 2, according to various embodiments of the present disclosure.

FIG. 3 is a cross-sectional view of a hydrogen pumping cell 420 that may be included in the fuel exhaust processor 400, according to various embodiments of the present disclosure. Referring to FIG. 4, the hydrogen pumping cell 420 may be polymer electrolyte (PEM) cells that include an anode gas diffusion layer (GDL) 422, a cathode GDL 424, and a membrane electrode assembly (MEA) disposed there between. The MEA may include the GDL, an anode 426, a cathode 428, and a polymer membrane 430 disposed there between. The hydrogen pumping cell 420 may be disposed between bipolar plates 432. The bipolar plates 432 may include channels to deliver reactants to the hydrogen pumping cells 420 disposed thereon. The bipolar plates 432 may be formed of material such as graphite.

The GDLs 422, 424 may be formed of a porous medium configured to distribute or remove the reactants received from adjacent bipolar plates 432. The GDLs may comprise, for example, carbon paper treated with a hydrophobic material, such as polytetrafluoroethylene (PTFE), to reduce water accumulation. The anode 426 may be configured to oxidize hydrogen. The cathode 428 may be configured to evolve hydrogen (i.e., convert $2H^+$ into $H_2$). For example, the anode 426 and the cathode 428 may include a Pt/C catalyst. In some embodiments, the cathode 428 may have a higher or lower catalyst loading than the anode 426, for example. The catalyst type (e.g., CO tolerant catalyst on the cathode and/or anode side) and loading may vary at anode 426 and/or cathode 428. The membrane 430 may be configured to transport ions. For example, the membrane 430 may include an ionomer such as Nafion. When an electrical potential is applied between the anode 426 and the cathode 428, hydrogen ions are generated at the anode 426, the hydrogen ions are driven through the membrane 430 by the applied electrical potential, and the hydrogen ions are recombined to evolve hydrogen gas at the cathode 428. In some embodiments, the anodes 426 may be carbon monoxide tolerant anodes, as disclosed in Indian Provisional Application number 2021-11016645 filed Mar. 8, 2021 and U.S. application Ser. No. 17/715,353, each of which is incorporated herein by reference in its entirety.

Shift Reactor With Active Cooling

Figure 4A:
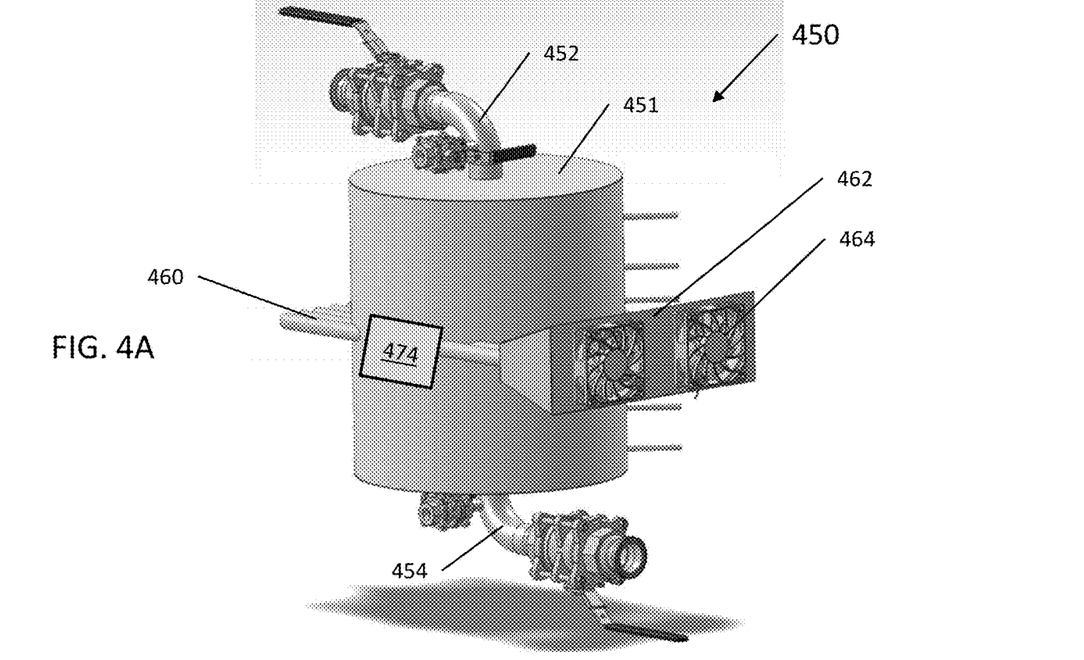
FIG. 4A is a perspective view of a shift reactor that may be included in the fuel exhaust processor of FIG. 2, according to various embodiments of the present disclosure.
Figure 4B:
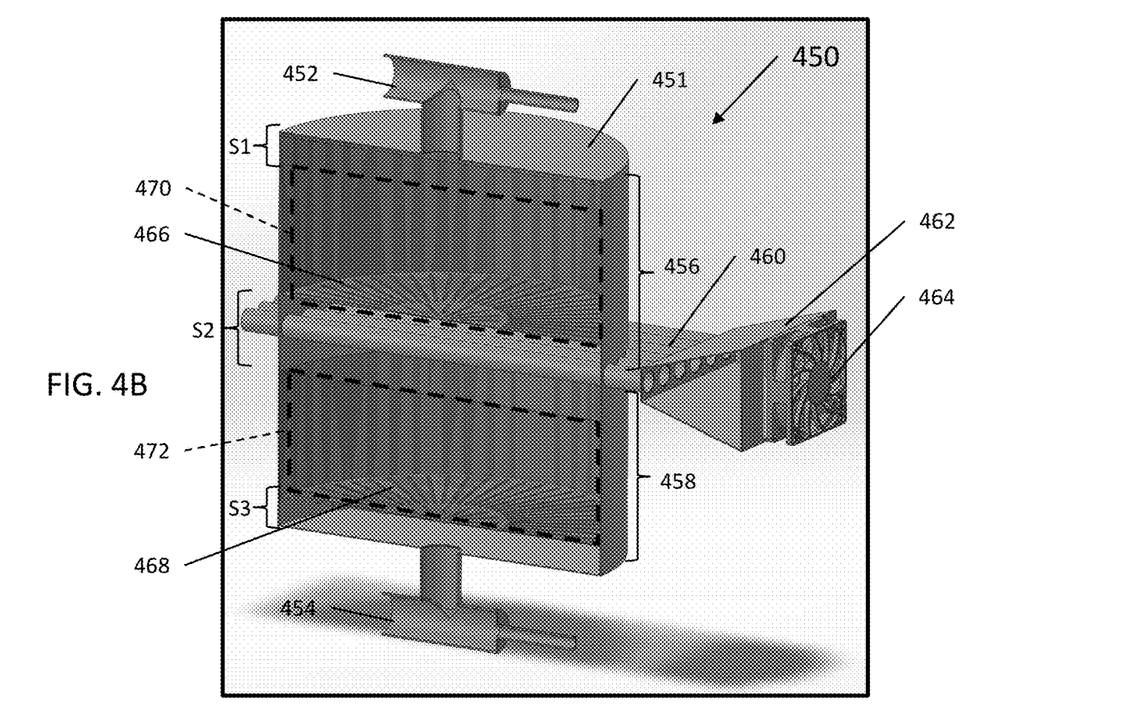
FIG. 4B is a cross-sectional view of the shift reactor of FIG. 4A.

FIG. 4A is a perspective view of a low-temperature shift reactor 450 that may be included in the fuel exhaust processor 400 of FIG. 2, according to various embodiments of the present disclosure, and FIG. 4B is a cross-sectional view of the shift reactor 450. Referring to FIGS. 4A and 4B, the shift reactor 450 may include a cover 451, an inlet 452, an outlet 454, a first chamber 456, a second chamber 458, cooling conduits 460, a fan housing 462, at least one fan 464, a first screen 466, a second screen 468, a first catalyst bed 470, a second catalyst bed 472, and a control unit 474.

The cover 451 may cover the first chamber 456, and the first chamber 456 may be disposed over the second chamber 458. The cooling conduits 460 may be disposed between the first and second chambers 456, 458. The fan housing 462 and the fans 464 may be connected to the cooling conduits 460. The first screen 466 may be disposed adjacent the bottom of the first chamber 456, and the second screen 468 may be disposed adjacent to the bottom of the second chamber 458. The first catalyst bed 470 may be disposed in the first chamber 456 and on the first screen 466, and the second catalyst bed 472 may be disposed in the second chamber 458 and on the second screen 468.

The first and second catalyst beds 470, 472 may include any suitable WGS reaction catalysts, such as an iron oxide or a chromium-promoted iron oxide catalyst. Depending on the temperature range, zinc-copper or ferrochromium alloy catalysts or other known catalysts may be used. The catalyst may have an acceptable catalytically active at temperature ranging from about 200° C. to about 300° C. Alternatively, the catalyst can continue to be active to as low as 150° C. in some instances. In some embodiments, the first and second catalyst beds 470, 472 may include the same catalyst or different catalysts. In various embodiments, the shift reactor 450 may be configured to reduce the carbon monoxide content of the anode exhaust to about 0.3% or less.

In various embodiments, the first catalyst bed 470 may not completely fill the first chamber 456. In particular, a first space S1 may be formed between the upper surface of the first catalyst bed 470 and a lower surface of the cover 451. The first screen 466 may separate the first catalyst bed 470 and the cooling conduits 460, and the top surface of the second catalyst bed 472 may be spaced apart from the cooling conduits 460, such that a second space S2 is formed around the cooling conduits 460, between the first and second chambers 456, 458. Similarly, the second screen 468 may separate the second catalyst bed 472 from the bottom of the second chamber 458, such that a third space S3 is formed under the second screen 468.

The inlet 452 may be configured to provide anode exhaust to the first chamber 456. In particular, the anode exhaust may be provided to the first space S1, before entering the first catalyst bed 470. Accordingly, the anode exhaust may be dispersed in the first space S1 and uniformly distributed in the first catalyst bed 470. The anode exhaust may then pass through the first screen 466 and into the second space S2, where the anode exhaust may be dispersed around the cooling conduits 460, before entering the second catalyst bed 472. The cathode exhaust may then flow through the second catalyst bed 472, the second screen 470, and into the third space S3, before entering the outlet 454.

The fans 464 may be variable speed fans configured to force air into the fan housing 462 and through the cooling conduits 460. The fan housing 462 may be triangular in cross-section and may be configured to channel the air output from the relatively large diameter fans 464 into the relatively small diameter the cooling conduits 460. Air flowing through the cooling conduits 460 may reduce the temperature of the cooling conduits 460, which may be heated by interaction with the anode exhaust. As such, the cooling conduits 460 may be configured to reduce the temperature of the anode exhaust, by transferring heat to the air flowing there through. In some embodiments, an optional air filter (not shown) may be disposed within the fan housing 462.

In various embodiments, the control unit 474 may be configured to control the speed of the fans 464, based on the temperature of the anode exhaust flowing through the shift reactor 450 and/or a temperature of the catalyst beds 470, 472. In particular, exothermic oxidation reactions occurring during operation of the shift reactor 450 may increase the temperature of the anode exhaust flowing there through. During steady state operation, the control unit 474 may be configured to operate the fan at a speed sufficient maintain the temperature of the anode exhaust within a desired temperature range, such as a temperature ranging from about 200° C. to about 250° C., such as a temperature ranging from about 210° C. to about 240° C.

In particular, the speed of the fans 464 may be controlled based on an anode exhaust flow rate through the shift reactor 450, with higher fan speeds being utilized at higher anode exhaust flow rates. In other embodiments, the fan speed may be controlled based on a temperature of the shift reactor 450 and/or a temperature of anode exhaust flowing past the cooling conduits 460 and/or output from the shift reactor 450. For example, the control unit 474 may include, or be operatively connected to, a temperature sensor, such as a thermocouple, configured to detect the anode exhaust temperature. For example, the temperature sensor may be configured to detect the temperature of the anode exhaust adjacent to the cooling conduits 460 and/or adjacent to the top of the second catalyst bed 472. In some embodiments, the shift reactor 450 may include multiple temperature sensors, in order to provide temperature detection redundancy, for example.

In some embodiments, the fans 464 may not be operated if relatively cool anode exhaust is provided to the shift reactor 450, such as during system startup. However, in some embodiments, the fans 464 may be operated during system startup, in order to prevent excessive heat accumulation due exothermic reactions that may occur due to adsorption of gas species to the catalyst material. In some embodiments, the shift reactor 450 may optionally include a heating element (not shown), such as heating tape disposed on an outer surface of the shift reactor 450. The heating element may be used, for example, during system startup, in order to heat the shift reactor 450 (e.g., to heat the first and/or second catalyst beds 470, 472) to a desired operating temperature.

In some embodiments, the first screen 466 and/or the cover 451 may be removable, so as to facilitate catalyst loading. For example, the cover 451 and the first screen 466 may be removed, a catalyst material may be filled between the cooling conduits 460 to form the second catalyst bed 472 in the second chamber 458. The first screen 466 may be installed and secured via tack welding or mechanical fasteners, and then a catalyst material may be filled into the first chamber 456 to form the first catalyst bed 470. The cover 451 may then be attached.

The cooling conduits 460 may be separated by a gap ranging from about 2 to about 7 mm, such as from about 3 to about 5 mm, in order to permit loading of a catalyst material into the second chamber 458. The cooling conduits 460 may have a triangular pitch or a rectangular pitch, in some embodiments. In various embodiments, the cooling conduits 460 may include heat transfer structures, such as external fins or the like, to increase heat transfer. In various embodiments, the shift reactor 450 may include a single row or cooling conduits 460, as shown in FIGS. 4A and 4B. In other embodiments, the shift reactor 450 may include multiple rows of cooling conduits 460 in the second space S2. In other embodiments, the shift reactor 450 may include more than two catalyst beds, and at least one row of cooling conduits disposed between each pair of catalyst beds. For example, the shift reactor 450 may include three catalyst beds and two rows of cooling conduits.

Methods of SOFC System Operation Including Fuel Exhaust Processing

Figure 5:
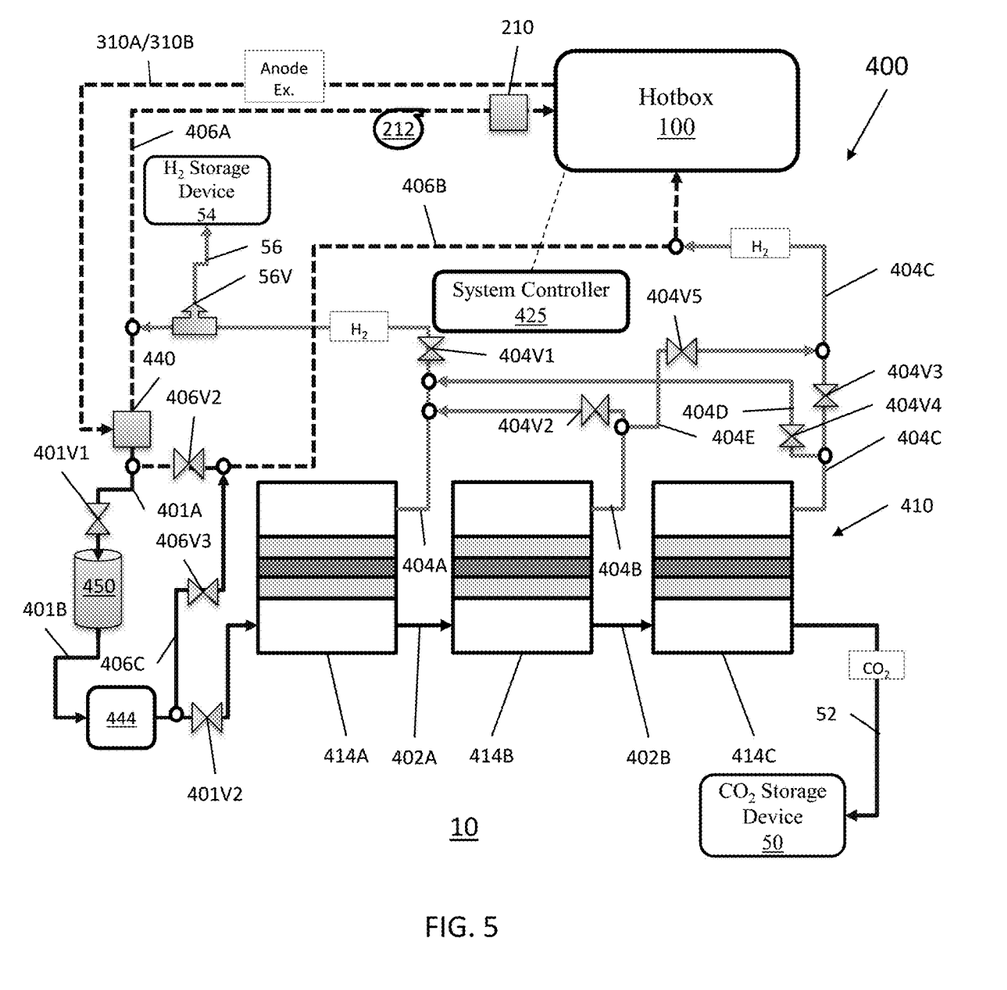
FIGS. 5-8 are schematic views showing fluid flow through the fuel cell system and fuel exhaust processor of FIGS. 1 and 2, according to various embodiments of the present disclosure.

FIG. 5 is a schematic view showing fuel flow through of the SOFC system 10 during a startup mode, according to various embodiments of the present disclosure, wherein fuel flow is shown by dashed lines. Referring to FIGS. 1 and 5, during startup, various components of the SOFC system 10 may heated from ambient temperatures to operating temperatures. Accordingly, the SOFC system may be configured to heat components as quickly as possible to operating temperatures.

In particular, anode exhaust may be output from the hotbox 100 to the splitter 440 of the fuel exhaust processor 400, via the second recycling conduit 310B. However, in some embodiments, the first recycling conduit 310A may be used to provide the anode exhaust. The splitter 440 may output a first portion of the anode exhaust back to the hotbox 100, via the first return conduit 406A. In particular, the first portion of the anode exhaust may be used to maintain a carbon to oxygen ratio in fuel provided to the SOFC stack 102.

The splitter 440 may output a second portion of the anode exhaust to the hotbox 100, via the second return conduit 406B. The first portion of the anode exhaust may be provided to the SOFC stack 102, and the second portion of the anode exhaust may be provided to the ATO 130.

In particular, the system controller 425 may close the first separator conduit valve 401V1 and the third return conduit valve 406V3, and may open the second return conduit valve 406V2, in order to direct the second portion of the anode exhaust away from the hydrogen separator 410 and back to the ATO 130. In other words, the hydrogen separator 410 may not be operated during system startup.

Figure 6:
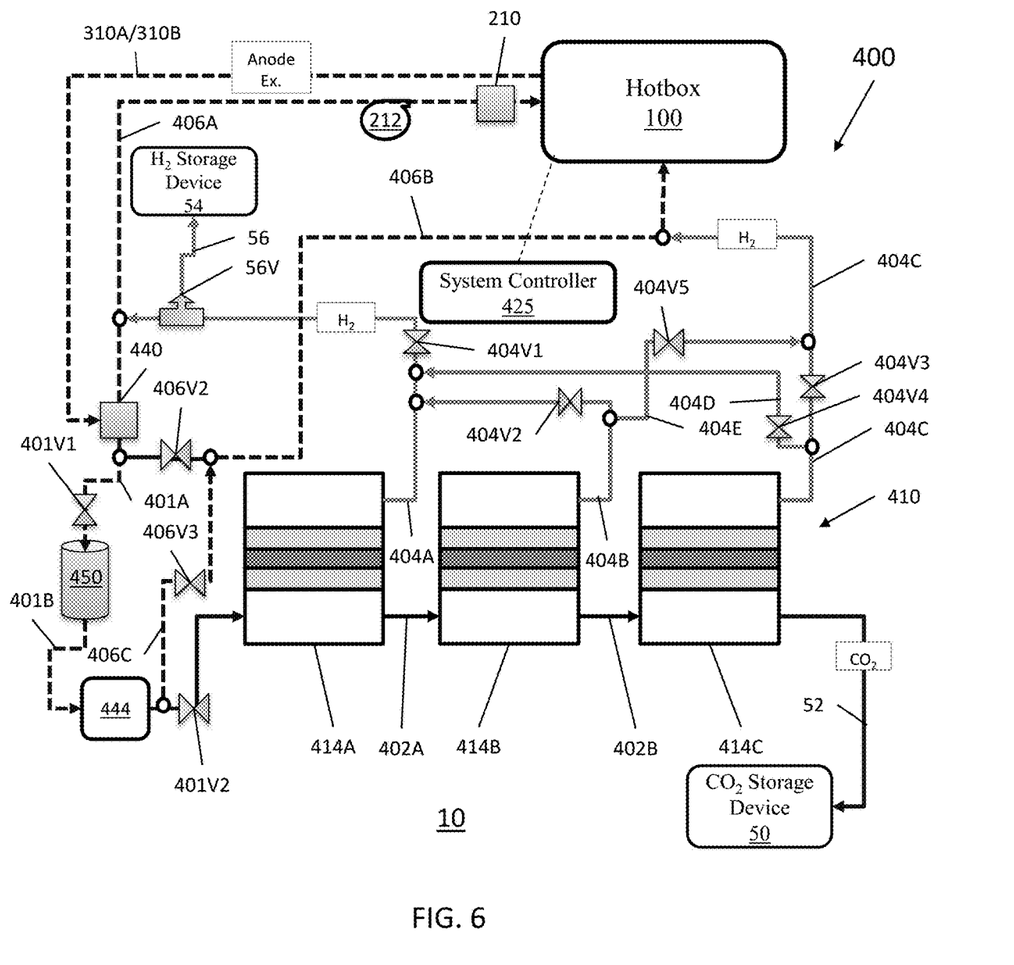

FIG. 6 is a schematic view showing fuel flow through of the SOFC system 10 during a low-current steady-state mode, according to various embodiments of the present disclosure, wherein fuel flow is show by dashed lines. Referring to FIGS. 1 and 6, if a relatively low current load, for example a current load of less than about 25 amps, is applied to the hotbox 100 and/or stacks 102 included therein, the amount of heat generated in the hotbox may be insufficient for stable power generation, without additional heat being generated by the ATO 130. Accordingly, the system controller 425 may be configured to provide anode exhaust from the fuel exhaust processor 400 to the ATO 130.

For example, anode exhaust may be output from the hotbox 100 to the splitter 440, via the first recycling conduit 310A. A first portion of the anode exhaust may be output from the splitter 440 and returned to the hotbox 100, via the first return conduit 406A.

A second portion of the anode exhaust is output from the splitter 440 to the shift reactor 450, via the first separator conduit 401A. The anode exhaust output from the shift reactor 450 may be provided to the optional heat exchanger 444, via the second separator conduit 401B, before being provided to the third return conduit 406C. In the alternative, the anode exhaust may be provided from the second separator conduit 401B directly to the third return conduit 406C. The anode exhaust may then be provided to the hotbox 100 for use in the ATO, via the second return conduit 406B.

Accordingly, during the low-current mode, the hydrogen separator 410 is not provided with anode exhaust and is not operated. In particular, the system controller 425 may close the second separator conduit valve 401V2, the second return conduit valve 406V2, and the first hydrogen conduit valve 404V1, to isolate the hydrogen separator 410, and may open the first separator conduit valve 401V1 and the third return conduit valve 406V3, to provide anode exhaust to the ATO 130.

Figure 7:
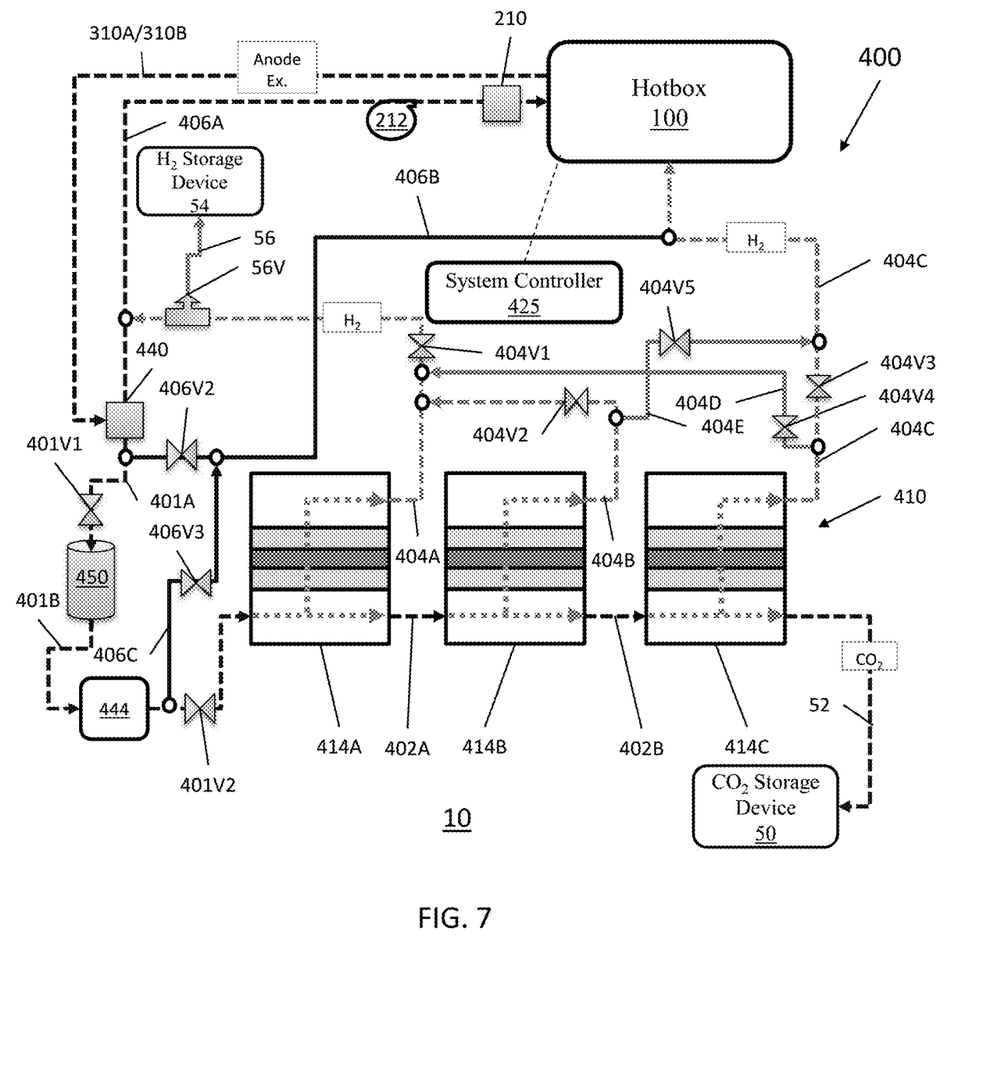

FIG. 7 is a schematic view showing fuel flow through of the SOFC system 10 during a high-current steady-state mode, according to various embodiments of the present disclosure, wherein fuel flow is show by dashed lines. Referring to FIGS. 1, 2, and 7, if a relatively high current load, for example a current load of at least 25 amps, is applied to the hotbox 100 and/or stacks 102 included therein, an amount of heat may be generated in the hotbox 100 may be sufficient or nearly sufficient for stable power generation. As such, the heat output and fuel consumption of the ATO 130 may be minimized.

For example, anode exhaust may be output from the hotbox 100 to the splitter 440, via the first recycling conduit 310A. A first portion of the anode exhaust may be output from the splitter 440 and returned to the hotbox 100, via the first return conduit 406A.

A second portion of the anode exhaust is output from the splitter 440 to the shift reactor 450, via the first separator conduit 401A. The shift reactor 450 may reduce the carbon monoxide content of the anode exhaust from about 5% by volume to less than about 0.3% by volume. In some embodiments, this further reduction in carbon monoxide content may reduce and/or prevent deactivation of anode catalysts of the hydrogen separator 410.

For example, the shift reactor 450 may be actively cooled during operation, such that the anode exhaust is output from the shift reactor 450 at a temperature of less than about 240° C., such as less than about 220° C., or less than about 200° C., which may be sufficient to prevent damage to the membranes of the hydrogen pumping cells 420. Accordingly, when the actively cooled shift reactor 450 is used, the heat exchanger 444 may be omitted in some embodiments.

However, in other embodiments, the heat exchanger 444 may be used to further reduce the temperature of the anode exhaust output from the shift reactor 450. For example, the heat exchanger 444 may reduce the temperature of the anode exhaust to about 100° C. or less, such as to a temperature of from about 80° C. to about 50° C., from about 75° C. to about 55° C., or to about 65° C. The heat exchanger 444 may cool the anode exhaust by transferring heat to ambient air.

The anode exhaust may be output from the shift reactor 450 and/or the heat exchanger 444 to the anode inlet of the first hydrogen pump 414A, via the second separator conduit 401B. In particular, the system controller 425 may close the second return conduit valve 406V2 and the third return conduit valve 406V3, and may open the first and second separator conduit valves 401V1, 401V2, such that the second portion of the anode exhaust is provided only to the fuel exhaust processor 400.

The anode exhaust may be distributed to the anodes of each hydrogen pumping cell 420 in the first hydrogen pump 414A. Power may be provided to the hydrogen pumping cells 420 to separate hydrogen from the anode exhaust. The evolved hydrogen may be output from the cathode outlet of the first hydrogen pump 414A to the first return conduit 406A, via the first hydrogen conduit 404A. The remaining anode exhaust may be output from the anode outlet of the first hydrogen pump 414A to the anode inlet of the second hydrogen pump 414B, via the first exhaust conduit 402A.

Power may be applied to the hydrogen pumping cells 420 of the second hydrogen pump 414B to separate hydrogen from the anode exhaust flowing therethrough. The separated hydrogen may be output from the cathode outlet of the second hydrogen pump 414B to the first hydrogen conduit 404A, via the second hydrogen conduit 404B. The remaining anode exhaust may be output from the anode outlet of the second hydrogen pump 414B to the anode inlet of the third hydrogen pump 414C, via the second exhaust conduit 402B.

Power may be applied to the hydrogen pumping cells 420 of the third hydrogen pump 414C to separate hydrogen from the anode exhaust flowing there through. The separated hydrogen may be output from the cathode outlet of the third hydrogen pump 414C to the second return conduit 406B, via the third hydrogen conduit 404C. The remaining anode exhaust may be output from the anode outlet of the third hydrogen pump 414C to the third hydrogen conduit 404C. In some embodiments, the remaining anode exhaust may comprise at least 95%, such as at least 97% or at least 98% by volume carbon dioxide. Accordingly, a purified carbon dioxide stream may be output from the fuel exhaust processor 400 and stored in the carbon dioxide storage device 50. The stored carbon dioxide may be provided to carbon dioxide consumers, such as the beverage industry, in order to recycle the carbon dioxide and provide supplemental income.

A first hydrogen stream (e.g., hydrogen-enriched fuel stream), including the hydrogen output from the first hydrogen pump 414A and the second hydrogen pump 414B, may be output to the hotbox 100 via the first hydrogen conduit 404A, the second hydrogen conduit 404B, and the first return conduit 406A. In particular, the first hydrogen stream may be provided to the mixer 210 and recycled for use in to the fuel cell stack 102.

In the alternative, all or a portion of the first hydrogen stream may be provided to the hydrogen storage via the hydrogen storage conduit 56 and stored in the hydrogen storage device 54. In some embodiments, the hydrogen storage valve 56V may be used to control how much of the first hydrogen stream is stored in the hydrogen storage device 54 and how much is provided to the SOFC system 10.

A second hydrogen stream (e.g., hydrogen-enriched fuel stream), including the hydrogen output from the third hydrogen pump 414C via the third hydrogen conduit 404C, may be provided to the hotbox 100 via the third hydrogen conduit 404C and the second return conduit 406B. In particular, the second hydrogen stream may be provided to the ATO 130 for oxidation by the second return conduit 406B.

A high-purity carbon dioxide stream may be output from the hydrogen separator 410 to the carbon dioxide storage device 50, via the carbon dioxide storage conduit 52. For example, the carbon dioxide stream may be at least 98 volume percent carbon dioxide. In some instances, the purity of the carbon dioxide stream may be less than 98 volume percent if that is compatible with the downstream use, such as greater than 95 volume percent.

Figure 8:
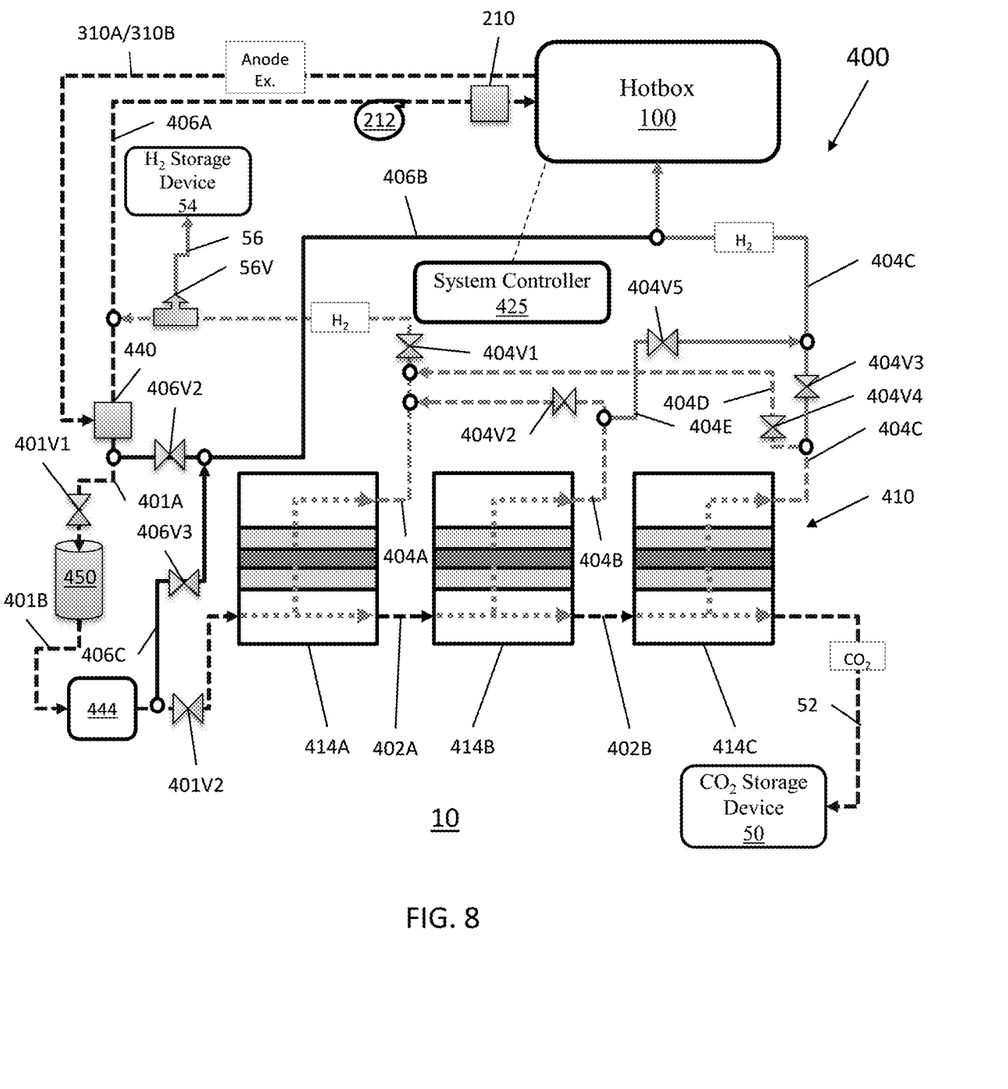

FIG. 8 is a schematic view showing fuel flow through of the SOFC system 10 during an alternative steady-state mode, according to various embodiments of the present disclosure, wherein fuel flow is show by dashed lines. The alternative high-current steady-state mode may be similar to the high-current steady-state mode of FIG. 7. As such, only the difference there between will be discussed in detail.

Referring to FIGS. 1, 2, and 8, it has been determined that by providing hydrogen rich recycled fuel to the hotbox 100, fuel reformation reactions may be correspondingly reduced, thereby reducing heat loss within the SOFC system 10. As a result, fuel cell stack operating temperatures may be maintained during steady-state operation, without providing fuel to the ATO 130.

Accordingly, the system controller 425 may be configured to close the third hydrogen conduit valve 404V3 and open the fourth hydrogen conduit valve 404V4, such that hydrogen extracted by the third hydrogen pump 414C is diverted into the fourth hydrogen conduit 404D and provided to the first return conduit 406A, via the first hydrogen conduit 404A. In other words, the hydrogen output from the third hydrogen pump 414C may be added to the first hydrogen stream provided to the fuel cell stack 102. In other words, a second hydrogen stream may not be provided to the ATO 130.

In some embodiments, the SOFC system 10 may be operated in a hydrogen generation mode to maximize hydrogen extraction and/or storage. In particular, the system controller 225 may be configured to increase hydrogen extraction by the fuel exhaust processor 400, by decreasing the fuel utilization rate of the SOFC stack 102 (e.g., a ratio of current drawn from the SOFC stack 102 to a flow rate of fresh fuel supplied to the SOFC stack 102 from the fuel inlet 300).

For example, the fuel utilization rate may be decreased by decreasing the current drawn from the SOFC stack 102 and/or by increasing the flow rate of fresh fuel to SOFC stack 102, such that the anode exhaust output to the fuel exhaust processor 400 has a higher hydrogen content. The higher hydrogen content of the anode exhaust may increase the amount of hydrogen extracted by the hydrogen separator 410. Thus, the hydrogen generation mode may include reducing a fuel utilization rate to increase hydrogen extraction.

In some embodiments, the hydrogen generation mode may utilize the hydrogen flow configuration shown in FIG. 7. In particular, hydrogen generated by the third hydrogen pump 414C may be provided to the ATO. Since the amount of hydrogen extracted by the third hydrogen pump 414C may be relatively low, as compared to the amounts of hydrogen extracted by the first and second hydrogen pumps 414A, 414B, the rate of hydrogen generation and storage may not be significantly decreased.

In the various embodiments, three hydrogen pumps 414A, 414B, 414C are shown, but the embodiments are not so limited. In some embodiments, varying numbers of hydrogen pumps may be used. For example, two hydrogen pumps may be used in some configurations. In the two hydrogen pump configuration, the first hydrogen pump and the second hydrogen pump output hydrogen to one or more components of the hotbox as fuel. Any of the hydrogen pumps may be configured to send the hydrogen stream to ATO 130 or back to hotbox 100 as fuel. Independent of the number of hydrogen pumps used, it is preferred to provide the output of the hydrogen pumps back to hotbox 100 as fuel, as this is thermally stable under most conditions. If thermal stability (e.g. due to low current SOFC operation) is not achievable, then the hydrogen from any of the hydrogen pumps may be output to ATO 130 either steadily, or for periodic timed durations (e.g. 1 minute out of 5, etc).

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The invention claimed is:

1. A fuel cell system comprising:
a hotbox;
a fuel cell stack disposed in the hotbox;
an anode tail gas oxidizer (ATO) disposed in the hotbox; and
a fuel exhaust processor fluidly connected to the hotbox and comprising:
a first hydrogen pump configured to extract hydrogen from the anode exhaust received from the fuel cell stack and to output the hydrogen to a first hydrogen stream provided to the fuel cell stack;
a second hydrogen pump configured to extract hydrogen from anode exhaust output from the first hydrogen pump and to output the hydrogen to the first hydrogen stream; and
a third hydrogen pump configured to extract hydrogen from anode exhaust output from the second hydrogen pump and to output the hydrogen to a second hydrogen stream provided to the ATO.

2. The fuel cell system of claim 1, further comprising a carbon dioxide storage device configured to store a carbon dioxide stream output from an anode outlet of the third hydrogen pump.

3. The fuel cell system of claim 1, further comprising a hydrogen storage device configured to store at least a portion of the first hydrogen stream.

4. The fuel cell system of claim 1, wherein:
the first hydrogen pump comprises a first stack of hydrogen pumping electrochemical cells;
the second hydrogen pump comprises a second stack of hydrogen pumping electrochemical cells;
the third hydrogen pump comprises a third stack of hydrogen pumping electrochemical cells; and
the first stack comprises a larger number of electrochemical cells than the second stack and the third stack; and
the hydrogen pumping cells each comprise an electrolyte disposed between a cathode and an anode.

5. The fuel cell system of claim 1, wherein the fuel exhaust processor further comprises a splitter configured to receive anode exhaust output from the fuel cell stack, output a first portion of the anode exhaust to the fuel cell stack, and output a second portion of the anode exhaust to the first hydrogen pump.

6. The fuel cell system of claim 5, further comprising a high temperature shift reactor disposed in the hotbox and configured to reduce the amount of the carbon monoxide in the anode exhaust provided to the splitter,
wherein the fuel exhaust processor further comprises a low temperature shift reactor configured to further reduce the amount of carbon monoxide in the anode exhaust product fed to the hydrogen pumps.

7. The fuel cell system of claim 6, wherein the fuel exhaust processor further comprises a heat exchanger configured to reduce the temperature of anode exhaust output from the low temperature shift reactor and provided to the first hydrogen pump.

8. The fuel cell system of claim 6, wherein the low temperature shift reactor comprises:
a first chamber;
a second chamber;
cooling conduits disposed between the first chamber and the second chamber;
a fan configured to force air through the cooling conduits;
a first catalyst bed disposed in the first chamber;
a second catalyst bed disposed in the second chamber;
an inlet fluidly connected to the first chamber; and
an outlet fluidly connected to the second chamber.

9. The fuel cell system of claim 8, wherein the low temperature shift reactor further comprises:
a first screen disposed in the first chamber; and
a second screen disposed in the second chamber,
wherein the first catalyst bed is disposed on the first screen and the second catalyst bed is disposed on the second screen.

10. The fuel cell system of claim 9, wherein:
a first space is formed in the first chamber above the first catalyst bed;
a second space is formed around the cooling conduits;
a third space is formed in the second chamber below the second screen; and
the low temperature reactor is configured such that anodes exhaust flows through the inlet, into the first space, through the first catalyst bed, into the second space, through the second catalyst bed, into the third space, and then into the outlet.

11. The fuel cell system of claim 8, wherein the low temperature shift reactor further comprises:
a temperature sensor configured to detect a temperature of anode exhaust flowing through the low temperature shift reactor; and
a control unit configured to control a speed of the fan according to the temperature detected by the temperature sensor.

12. The fuel cell system of claim 6, further comprising:
a first return conduit that fluidly connects an outlet of the splitter to the fuel cell stack;
a first separator conduit that fluidly connects an outlet of the splitter to an inlet of the low temperature shift reactor;
a second return conduit that fluidly connects the first separator conduit or an outlet of the splitter to the ATO;
a second separator conduit that fluidly connects an outlet of the low temperature shift reactor to an anode inlet of the first hydrogen pump;
a third return conduit that fluidly connects the second separator conduit to the second return conduit;
a first hydrogen conduit fluidly connecting a cathode outlet of the first hydrogen pump to the first return conduit;
a second hydrogen conduit fluidly connecting a cathode outlet of the second hydrogen pump to the first return conduit; and
a third hydrogen conduit fluidly connecting a cathode outlet of the third hydrogen pump to the second return conduit.

13. The fuel cell system of claim 12, further comprising:
a fourth hydrogen conduit that fluidly connects the third hydrogen conduit to the second return conduit; and
a fifth hydrogen conduit that fluidly connects the second hydrogen conduit to the second return conduit.

14. A fuel cell system comprising:
a hotbox;
a fuel cell stack disposed in the hotbox;
an anode tail gas oxidizer (ATO) disposed in the hotbox;
a recycling conduit configured to receive anode exhaust from the fuel cell stack;
a splitter fluidly connected to the recycling conduit;
a low temperature shift reactor;

a hydrogen separator comprising:
  a first hydrogen pump;
  a second hydrogen pump that is fluidly connected to the first hydrogen pump; and
  a third hydrogen pump that is fluidly connected to the second hydrogen pump;
a supply conduit that fluidly connects an outlet of the splitter to the hydrogen separator;
a first separator conduit fluidly connecting the splitter to the low temperature shift reactor;
a second separator conduit fluidly connecting the low temperature shift reactor to the first hydrogen pump;
a first return conduit that fluidly connects an outlet of the splitter to the fuel cell stack;
a second return conduit that fluidly connects an outlet of the splitter or the separator conduit to the ATO; and
a third return conduit that fluidly connects the separator conduit to the second return conduit.

15. A method of using the fuel cell system of claim 14 in a startup mode, the method comprising:
  providing anode exhaust generated by the fuel cell stack to the separator through the recycling conduit;
  outputting a first portion of the anode exhaust from the separator to the fuel cell stack through the first return conduit; and
  outputting a second portion of the anode exhaust from the separator to the ATO through the second return conduit.

16. A method of using the fuel cell system of claim 14 in a low current mode, the method comprising:
  providing anode exhaust generated by the fuel cell stack to the separator through the recycling conduit;
  providing a first portion of the anode exhaust from an outlet of the splitter to the fuel cell stack through the first return conduit;
  providing a second portion of the anode exhaust from an outlet of the splitter to the low temperature shift reactor through the first separator conduit; and
  providing anode exhaust from an outlet of the low temperature shift reactor to the ATO through the second separator conduit, the third return conduit, and the second return conduit.

17. The method of claim 16, wherein:
  the providing anode exhaust from an outlet of the low temperature shift reactor to the ATO further comprises cooling the anode exhaust in the second separator conduit using a heat exchanger; and
  the method further comprises actively cooling the anode exhaust in the low temperature shift reactor using forced air.

18. A method of using the fuel cell system of claim 14 in a steady state mode, the method comprising:
  providing anode exhaust generated by the fuel cell stack to the separator through the recycling conduit;
  providing a first portion of the anode exhaust from an outlet of the splitter to the fuel cell stack through the first return conduit;
  providing a second portion of the anode exhaust from an outlet of the splitter to the low temperature shift reactor through the first separator conduit;
  providing anode exhaust from an outlet of the low temperature shift reactor to the hydrogen separator through the second separator conduit;
  providing a first hydrogen ($H_2$) stream extracted from the anode exhaust by the first and second hydrogen pumps to the fuel cell stack through the first return conduit; and
  providing a second hydrogen stream extracted from the anode exhaust by the third hydrogen pump to the ATO through the second return conduit.

19. The method of claim 18, wherein the anode exhaust is sequentially provided to anodes of the first hydrogen pump, the second hydrogen pump, and the third hydrogen pump.

20. The method of claim 18, further comprising:
  decreasing a current load applied to the fuel cell stack and/or increasing a flow rate of fresh fuel to the fuel cell stack, in order to decrease a fuel utilization rate of the fuel cell stack and to increase an amount of hydrogen extracted from the anode exhaust by the hydrogen separator; and
  storing the first hydrogen stream in a hydrogen storage device fluidly connected to the first return conduit.

* * * * *